Patented Oct. 8, 1940

2,216,736

UNITED STATES PATENT OFFICE 2,216,736

PHOTOGRAPHIC FILM

Wallace Hume Carothers, deceased, late of Wilmington, Del., by the Wilmington Trust Company, executor, Wilmington, Del., assignor to E. I. du Pont de Nemours and Company, Wilmington, Del., a corporation of Delaware No Drawing. Application September 27, 1938, Serial No. 232,012

6 Claims. (Cl. 95—9)

This invention relates to films useful in photographic processes and more particularly to new and improved photographic films comprising certain synthetic polymers carrying a light-sensitive layer or layers.

Photographic films have heretofore been made almost exclusively from cellulose derivatives. Of these derivatives nitrocellulose, in spite of its fire hazard, has been used most extensively. Although cellulose acetate has replaced nitrocellulose in certain types of film, this material has relatively low water-resistance, and poor strength and flexibility, especially at low humidities. This lack of flexibility with consequent tendency to breakage and wear is particularly undesirable in the case of moving picture film. The necessity of using thick films to compensate for poor strength is not only an economic disadvantage but is also detrimental in color photography due to the image distortion caused by relatively wide separation of the emulsions applied to opposite sides of the film. It will be apparent, therefore, that there is a demand for a non-inflammable photographic film which is not subject to the limitations of cellulose acetate films.

This invention has as its object the production of a new and improved light-sensitive film. A further object is to provide a photographic film which has a low fire hazard and which has good strength, durability, dimensional stability, and flexibility. Other objects will appear hereinafter.

These objects are accomplished by coating with a light-sensitive (radiation-sensitive) material a film derived from a crystalline, synthetic linear superpolymer. More particularly the invention comprises a light-sensitive film composed of a support of fiber-forming crystalline, synthetic linear polymer, that is a superpolymer, and a light-sensitive layer or layers comprising a photographic silver halide composition.

The photographic films described herein in which the film base consists essentially of these synthetic linear fiber-forming polymers represent a marked advance over the films now used in the combination of desired properties such as high strength, flexibility, non-inflammability, water-resistance, and resistance to dimensional changes with variations in atmospheric conditions. The improved films of the present invention, as will be later referred to in more detail, present valuable advantages in the field of color photography.

Among the most useful of the crystalline, synthetic linear superpolymers used in the practice of this invention are those described in Patents 2,071,250, 2,071,252 and 2,071,253. These high molecular weight or fiber-forming linear polymers are obtained by reacting under suitable conditions with heat treatment bifunctional reactants and continuing the reaction until the superpolymeric or fibre-forming stage is reached. This stage is readily determined by touching the molten mass with a glass rod and drawing the rod quickly away. If the fiber-forming stage is reached a filament of considerable strength and pliability is obtained. In general the crystalline synthetic linear superpolymers do not exhibit fiber-forming properties unless the intrinsic viscosity is above 0.4 where intrinsic viscosity is defined as $$\frac{\log_e \eta r}{C}$$

wherein $\eta r$ is the viscosity of a dilute meta-cresol solution of the polymer divided by the viscosity of meta-cresol in the same units and at the same temperature, and C is the concentration in grams of polymer per 100 cc. of solution. The filaments of these polymers are capable of being cold drawn into oriented fibers, that is, the filaments upon application of tensile stress in the solid state yield strong useful textile fibers which upon X-ray examination exhibit molecular orientation along the fiber axis. Molecularly oriented films, ribbons and the like may be also obtained by cold working (application of compressive stress) as in the cold rolling of films, ribbons, sheets, and the like. Cold rolling improves the toughness, stiffness, the modulus of elasticity, and the tensile strength of the products.

The polymers described in the above mentioned patents include polyesters obtained from dibasic acids and glycols, polyamides obtained from diamines and dicarboxylic acids or amide-forming derivatives thereof, and polyacetals. The mention of bifunctional reactants does not necessarily mean two different bifunctional compounds but includes such compounds in which molecules of the same substance combine to bring about linear polymerization, as for instance in the polymerization of amino acids or their amide-forming derivatives such as omega-caprolactam to polyamides, in the production of polyethers from glycols, and in the polymerization of ethylene at high pressure as described in application Serial Number 123,722, filed February 2, 1937 by E. W. Fawcett et al.

The mentioned ethylene polymers are obtained by subjecting ethylene to pressures in excess of 500 atmospheres, preferably more than 1000 atmospheres, at a temperature of 100° C. to 400° C., a typical instance being about 2000 atmospheres at 170° C. for about 4 hours. These ethylene polymers are saturated compounds corresponding in composition to $(CH_2)_x$, have a molecular weight of at least 6000, are negligibly soluble in xylene at normal temperatures but soluble at its boiling point, and are waxy in feel.

Other examples of these crystalline, linear fiber-forming polymers are the polythioureas obtained by the reaction of a diamine and a diisothiocyanate, polyureas obtained by the reaction of a diamine or a diurethane and by the reaction of a diamine and a diisocyanate, polycarbamates and polythiocarbamates obtained by reaction of a diisocyanate or a diisothiocyanate and a diol such as a dihydric alcohol, a dihydric phenol, or a dithiol.

All of the above mentioned polymers are crystalline rather than resinous, their microcrystalline nature being evidenced by their sharp melting point and the type of diffraction patterns which they furnish upon X-ray examination.

Since the crystalline, synthetic linear superpolymers melt sharply, and without appreciable decomposition, it is possible to form the film base, or sheets from which the films are cut, directly from the molten polymers. In order to insure the uniform production of clear films, the films obtained from the molten polymers are preferably tempered by rapidly chilling. For this purpose the polymer can be extruded as a sheet into a cooling atmosphere or into a suitable quenching liquid, such as water or other inert non-solvent for the polyamide. For example, the polymer can be cast in sheet form onto a cool metal surface; or it can be formed into a sheet by rolling between metal rolls.

In many instances it is found advantageous to subject the films thus formed to one or more operations designed to improve the physical properties of the films. One such operation is that of cold working, previously referred to, wherein compressive stress is applied to the solid polymer, causing it to flow in a preferred direction. A convenient method for carrying out the process of cold working consists in passing the film of the polymer between "cold rolls," i. e. at temperatures substantially below the melting point of the polymer. Another operation ("setting") often found of value consists in subjecting the films under tension to the action of heat with or without simultaneous action of a non-solvent mild swelling agent for the polymer, e. g. water, steam or alcohol, and allowing it to cool under the continued application of tension.

In the preferred embodiment of the invention the film is formed by extrustion into a "tempering" bath, followed, if desired, by the operations of cold rolling and setting. These operations lead to a strong, flexible, and in many instances, to a more transparent product. Upon this support light-sensitive layers are coated by methods known to those skilled in the art. The light-sensitive layer generally consists of a gelatino-silver halide emulsion of a type used in modern photographic practice.

The following examples, in which the quantities are stated in parts by weight, illustrate the invention more specifically.

*Example I*

A film prepared from an interpolymer of hexamethylene adipamide and ethylene adipate of 70% ester content, melting at 140° C., and having an intrinsic viscosity of 0.57 was extruded between forming rolls into cold water. The resulting extruded film was cold rolled to 100% elongation. This film was found to have a tensile strength of 3300 lbs./sq. in. based on the original dimensions and an elongation of 120% at break. The film was subbed with a solution of a cyclohexane sulfonamide-formaldehyde resin in a mixture of acetone and methanol. After drying, it was coated with a gelatin-silver halide emulsion. The coated film showed resistance to flaking of the emulsion on bending, was strong and flexible and was resistant to burning when held in a flame.

*Example II*

An interpolymer containing 50% hexamethylene adipamide and 50% ethylene glycol sebacate melting at 158° C. was extruded into cold water to from a film. Based on the original dimensions, the film had a tensile strength of 7700 lbs./sq. in. and a tensile strength of 15,000 lbs./sq. in. calculated on the break dimensions. The film melted when held in a flame but was resistant to burning. After subbing with a mixture of 2 parts of phenol and 50 parts of a gelatin-cellulose acetate sub-coat comprising a solution containing 1.8% gelatin and acetone, methyl alcohol, water and acetic acid in suitable proportions, the film was coated with a gelatin-silver bromide emulsion. Excellent anchorage of the emulsion to the film base was obtained.

*Example III*

Polydecamethylene thiourea having a melting point of between 140° C. to 180° C., and an intrinsic viscosity of 0.30 was hot pressed to form a clear, practically colorless film. This film was found to have a tensile strength of 10,000 lbs./sq. in. based on the original dimensions. After subbing with a mixture of 2 parts of phenol and 50 parts of a gelatin-cellulose acetate sub-coat comprising a solution containing 1.8% gelatin and acetone, methyl alcohol, water and acetic acid in suitable proportions, the film was coated with gelatin-silver bromide emulsion. The anchorage of the emulsion to the film base was satisfactory. A small piece of the coated film held in a flame burned slowly and ceased to support combustion on removal from the flame.

*Example IV*

Polyhexamethylene thiourea melting between 140° C. and 220° C. and having an intrinsic viscosity of 0.28 was hot pressed to form a clear, transparent film. This film which showed a tensile strength of 8000 lbs./sq. in. based on the original dimensions was subbed with a mixture of 2 parts of phenol and 50 parts of a gelatin-cellulose acetate sub-coat comprising a solution containing 1.8% gelatin and acetone, methyl alcohol, water and acetic acid in suitable proportions, and was then coated with a gelatin-silver bromide emulsion. Good anchorage of the emulsion to the film base was obtained. A small piece of the coated film, held in a flame, burned slowly and ceased to support combustion on removal from the flame.

*Example V*

Polydecamethylene urea having a melting point of 215° C. to 240° C., and an intrinsic viscosity of 0.23 was hot pressed to form a clear, transparent film. This film which showed a tensile strength of 6000 lbs./sq. in. based on the original dimensions was subbed with a mixture of 2 parts of phenol and 50 parts of a gelatin-cellulose acetate sub-coat comprising a solution containing 1.8% gelatin and acetone, methyl alcohol, water and acetic acid in suitable proportions, and coated with a gelatin-silver bromide emulsion. Anchorage of the emulsion to the film base was less satisfactory than in Example IV but the coated film showed considerable resistance to burning when held in a flame.

*Example VI*

Polydecamethylene carbamate having a melting point of 145° C., and an intrinsic viscosity of 0.61 was hot pressed to form a clear, colorless film, having a tensile strength of 4800 lbs./sq. in. based on the original dimensions. After coating with a sub-coat comprising a mixture of 2 parts of phenol and 50 parts of a gelatin-cellulose acetate sub-coat comprising a solution containing 1.8% gelatin and acetone, methyl alcohol, water and acetic acid in suitable proportions, the film was coated with a gelatin-silver bromide emulsion. Satisfactory anchorage of the emulsion to the film base was obtained. A small piece of the film held in a flame to determine its fire resistance burned with great difficulty, melted into globules and ceased to support combustion upon removal from the flame, whereas under similar treatment a cellulose nitrate film burned violently.

As pointed out above, the present invention is applicable generally to the crystalline, synthetic linear fiber-forming polymers as exemplified by superpolyamides, superpolyesters, superpolyureas, superpolythioureas, superpolyacetals, superpolycarbamates, superpolythiocarbamates, superpolyethers, interpolymers of superpolyesters and superpolyamides, and also the mentioned solid polymer of ethylene.

In general, crystalline, synthetic linear superpolymers are relatively insoluble in the more common solvents but certain members of this class including superpolyesters and superpolyester-superpolyamide interpolmers are soluble in aliphatic hydrocarbons and in certain special mixtures of halogenated hydrocarbons and alcohols. Films can therefore be prepared by flowing solutions or emulsions of the crystalline, synthetic linear superpolymers on a suitable surface, for example, glass, and evaporating the solvent, or by regenerating the solvent in films formed by extruding a solution of a superpolymer through a slit orifice or between rolls into a suitable coagulating bath. Superpolyester-superpolyamide interpolymers containing high proportions of polyester are more soluble than the superpolymers of this type containing lower proportions of the polyester and these polymers are easily obtained in film form by solvent evaporation procedures.

The films used in the preparation of the light-sensitive film elements of this invention need not necessarily consist solely of the fiber-forming crystalline, synthetic linear polymers. It is sometimes desirable to use softening or plasticizing agents in conjunction with the polymers. The addition of plasticizer tends to make the film more flexible and frequently improves the clarity.

The light-sensitive layer or layers, as stated above, preferably consist of a gelatino-silver halide emulsion. It may, however, be composed of any light-sensitive combination of materials such as bichromated hydrophilic colloids, e. g., albumen, gelatin, gum Arabic, or glue in conjunction with ammonium bichromate. In addition, the light-sensitive compound may be contained in mixtures of hydrophilic, reversible protein colloids and water-dispersible derivatives of cellulose such as cellulose diglycollate, sodium cellulose glycollate, water-soluble synthetic resins and gums such as polyvinyl alcohol and gum Arabic. For photomechanical films such mixtures of carriers for the light-sensitive compounds are particularly useful. The light-sensitive layer or layers may also consist of iron salts or mixtures of light-sensitive diazonium compounds and coupling components. Furthermore, there may be a plurality of light-sensitive layers arranged on one or both faces of the support as is common in certain processes of color photography. The films contemplated in the present invention may also bear a photographically-produced sound track. In many cases it is found advisable to dye or tint the support or to provide it with an antistatic, antihalation layer or layers provided with a removable light-obstructive material absorptive of all colors which affect the light-sensitive coating.

The films under the present invention may be made up of fiber-forming, crystalline, synthetic linear polymers either wholly or in part. In some cases, it is found advantageous to coat one or two sides of the support with other polymeric materials, for example, cellulose acetate, nitrocellulose, esters and acetals of polyvinyl alcohol, polyvinyl chloride, polyhydric alcohol-polybasic acid resins and ethyl cellulose. It has been found that the adhesion between cellulose nitrate and superpolymers is particularly good. More frequently, however, it is advantageous to coat the surface of film bases prepared from these other polymeric materials with crystalline, synthetic linear superpolymers. In certain cases it has also been found advantageous to prepare a film composed of more than one fiber-forming crystalline, synthetic linear polymer.

As stated above, the crystalline, synthetic linear superpolymers may be used to impart their desirable qualities to other polymers by means of surface coatings. Thus the fire hazard of cellulose nitrate films is substantially lowered by surface coating with one of the polymers herein described.

Splicing of the films can be readily accomplished by the application of solvents and pressure at normal or elevated temperatures. The choice of solvents is of course dictated by the particular polymer employed. For example, "positive" film having a superpolyamide base is spliced by application of pressure to the over-lapped ends to be joined after coating them with a splicing solution comprising a major proportion of phenol or formic acid, or by melting them together in the absence of splicing solution by the application of heat and pressure. Under these conditions a strong bond with marked resistance to flexing is obtained.

The superpolymer films used as supports may be of different thicknesses, depending upon the use to which the finished article is to be put. Many of the polymers can be formed into films considerably thinner than was previously known in the art without showing decreased resistance to wear. The preferred thickness also varies with the nature of the fiber-forming, crystalline, synthetic linear polymer chosen.

The photographic films of this invention possess many outstanding advantages. They are in general characterized by extreme strength, good flexibility, good water-resistance, and absence of fire hazard, a combination of properties not possessed by the nitrocellulose or cellulose acetate films. The great strength of the present films manifests itself, in the case of cinematographic films, in a large increase in the life of films continually exposed to the wear of projection. A further manifestation of this strength is the fact that it is possible to use films of the order of 0.002" to 0.003" thickness, which is in the order of one-half of the thickness of the films previously used, without decreasing the wear resistance of the film element. This is not only an economic advantage but also an advantage in utility and convenience since it is possible to prepare photographic films of less weight and to increase the footage per roll. Furthermore, the use of thin films is of extreme practical importance in connection with processes of color photography for it makes feasible the coating of emulsions on opposite sides of the support without causing distortion of the subsequent picture due to the intervening layer of film base. This unique property makes the films of the present invention specially advantageous in the preparation of films for color photography. In place of multilayer coatings on a single film base, thin films of the herein described crystalline, synthetic linear superpolymers may be used in a tripack arrangement of films where image distortion due to the separation of two of the sensitive emulsions by one of the film bases is reduced to a surprising minimum by the use of these thin films.

Extremely thin films of these polymers make possible stripping emulsion films and papers, particularly useful in the photomechanical and color photography fields. For example, a double-weight, photographic paper stock, water-proofed in the well known manner, is coated on one side with a water-soluble agglutinant such as refined glue or casein. When partially dry, the agglutinant surface is brought into contact with a similarly coated agglutinant surface of a thin film of the superpolymer approximately 0.0008" in thickness. The laminated combination is held under pressure until the cementation of the agglutinant is firm and then dried. After drying, the film surface is subbed as indicated in the previous examples and then coated with a layer of a silver-gelatino-halide emulsion. After exposure, developing, fixing and, if desired, subsequent coloring, the emulsion layer and its thin support can be subbed while wet from the temporary paper base and transferred to a permanent support.

The films of this invention, as has been pointed out above, burn with great difficulty and, even when placed in a flame, show none of the violent burning associated with cellulose nitrate. In most cases the films melt into globules of polymer which burn very slowly or not at all and, when removed from the flame, die out spontaneously.

It will be apparent from the foregoing description that the new photographic films described herein possess a combination of properties ideally suited for their use as supports for light-sensitive or radiation-sensitive layers. No limitations appear to exist upon their use in the photographic and photomechanical industries. That is, they can be used with the advantages outlined above in cut or roll film, in amateur and professional cinematography, the permanent recording of documents, X-ray diagnosis, color photography, and sound recording.

As many apparently widely different embodiments of this invention may be made without departing from the spirit and scope thereof, it is to be understood that the invention is not limited to the specific embodiments thereof except as defined in the appended claims.

What is claimed is:

1. A non-inflammable, water-resistant motion picture film which, as compared to cellulose acetate film exhibits a marked increase in life when continually exposed to the wear of projection, said motion picture film comprising a photographic light sensitive layer carried by a perforated smooth, continuous, transparent film base comprising essentially crystalline synthetic linear polymer which is obtainable by reacting with heat treatment a linear polymer-forming composition, which melts without decomposition, and which is capable of being formed into fibers showing by characteristic X-ray patterns orientation along the fiber axis.

2. A non-inflammable, water-resistant photographic film which is adapted for color photography of the type producible by color coupling, and which comprises a plurality of photographic light sensitive layers carried by a smooth, continuous, transparent film base comprising essentially crystalline synthetic linear polymer which is obtainable by reacting with heat treatment a linear polymer-forming composition, which melts without decomposition, and which is capable of being formed into fibers showing by characteristic X-ray patterns orientation along the fiber axis.

3. A non-inflammable, water-resistant photographic film which comprises a photographic sensitive layer carried by a smooth, continuous, film base comprising essentially crystalline synthetic linear polymer which is obtainable by reacting with heat treatment a linear polymer-forming composition, which melts without decomposition, and which is capable of being formed into fibers showing by characteristic X-ray patterns orientation along the fiber axis.

4. The photographic film set forth in claim 3 in which said linear polymer is a polyester-amide.

5. The photographic film set forth in claim 3 in which said film base exhibits molecular orientation.

6. The photographic film set forth in claim 3 in which said photographic sensitive layer is a gelatin silver halide layer.

WALLACE HUME CAROTHERS,
By ELWYN EVANS,
*For The Wilmington Trust Company, Executor of the Estate of Wallace Hume Carothers, Deceased.*

CERTIFICATE OF CORRECTION.

Patent No. 2,216,736.   October 8, 1940.

WALLACE HUME CAROTHERS, DECEASED,
WILMINGTON TRUST COMPANY, EXECUTOR.

It is hereby certified that error appears in the printed specification of the above numbered patent requiring correction as follows: Page 1, second column, lines 15 to 17 inclusive, strike out the formula and insert instead the following -

$$-- \frac{\log_e Nr}{C} --;$$

line 19, for "$\eta r$" read --Nr--; page 2, first column, line 14, for the word "or" read --and--; same line, for "and" read --or--; page 3, first column, line 41, for "interpolmers" read --interpolymers--; page 4, first column, line 38, for "aggluinant" read --agglutinant--; and that the said Letters Patent should be read with this correction therein that the same may conform to the record of the case in the Patent Office.

Signed and sealed this 5th day of November, A. D. 1940.

Henry Van Arsdale,
Acting Commissioner of Patents.

(Seal)